United States Patent Office 3,767,599
Patented Oct. 23, 1973

3,767,599
MIXED METALLO-ORGANIC CATALYSTS FOR THE POLYMERIZATION OF EPOXY COMPOUNDS AND METHODS FOR THE POLYMERIZATION OF EPOXY COMPOUNDS USING SAID CATALYSTS
Henricus Gerardus Joseph Overmars, Zeist, and Aris van Elven, Utrecht, Netherlands, assignors to Schering AG., Bergkamen, Germany
No Drawing. Filed Dec. 29, 1971, Ser. No. 213,823
Claims priority, application Germany, Jan. 18, 1971, P 21 02 102.3
Int. Cl. C08g 23/14
U.S. Cl. 260—2 A          10 Claims

ABSTRACT OF THE DISCLOSURE

Catalysts, useful for the polymerization of epoxy compounds, which are mixtures of (1) an organoantimony compound of the formula $$R_mSbX_n$$

wherein R is an organic radical, X is hydroxy, oxygen, or halogen, m is an integer from 1 to 5, and $n=5-m$, and (2) an organoaluminum compound of the formula $$R'_3Al$$

wherein R' is alkyl and one R' may be hydrogen.

Method of polymerizing epoxy compounds such as epichlorohydrin in the presence of the mixed catalyst described above.

---

The present invention relates to mixtures of organoantimony and organoaluminum compounds useful as mixed catalysts for the polymerization of epoxy compounds, and to methods for polymerizing epoxy compounds in the presence of such mixed catalysts.

A number of metallo-organic catalysts, as well as complex compounds or the reaction products of metallic organic compounds, are known in the art for use in the polymerization of epoxy compounds. These catalysts, however, have considerable disadvantages.

Thus, the catalyst system according to French patent publication No. 1,540,239, comprising diisobutylaluminum acetyl acetonate, diethyl zinc and water, requires a long reaction time and elevated temperatures to achieve even moderate yields.

The processes disclosed in British patent publication No. 898,306, require disproportionately large amounts of catalyst (4 mol percent) and long reaction times.

The disadvantage of the organoaluminum catalysts described in German patent publication No. 1,963,686 is that their preparation requires that they be aged at a high temperature, 95° C., which must be maintained for at least one hour. In addition, external heating of the reaction mixture, generally to a temperature of 95° C., is required for obtaining useful yields of the polymer.

The present invention avoids all of these disadvantages such as a long reaction time, heating, and large amounts of catalyst.

The mixed catalysts of the invention are formed from
(a) Organo-derivatives of pentavalent antimony of the formula $$R_mSbX_n$$

wherein R is aromatic, particularly phenyl or alkyl, preferably alkyl having from 1 to 4 carbon atoms; X is hydroxy, or a divalent oxide oxygen replacing two hydroxy radicals, or halogen; m is a small whole number from 1 to 5, preferably from 1 to 3; and $n=5-m$, with
(b) Organoaluminum compounds of the formula $$R'_3Al$$

wherein R' is alkyl having up to 8 carbon atoms, preferably having from 4 to 6 carbon atoms, and wherein one of the three radicals R' may be hydrogen. In these mixed catalysts, the mol ratio of the organoantimony compounds to the organoaluminum compounds is between 1:1 and 1:10, preferably between 1:1 and 1:4. The components can be combined in any desired fashion, for example by stirring them together for several minutes in an inert solvent at 20° C.

Effective catalysts can be prepared from these components in a broad spectrum. Thus, the organic radicals in the antimony compound may be aromatic, particularly phenyl, or aliphatic, preferably methyl or n-butyl. The radicals X in the antimony compound can be either the oxygen-containing radicals discussed above or other electronegative radicals, for example halogen.

The following materials are exemplary of antimony compounds useful according to the present invention:

Phenyl-antimony-oxide-dihydroxide, $PhSbO(OH)_2$;
Diphenyl-antimony-oxide-hydroxide, $Ph_2SbOOH$;
Triphenyl-antimony-dihydroxide, $Ph_3Sb(OH)_2$;
Dimethyl-antimony-oxide-hydroxide, $Me_2SbOOH$;
Di-n-butyl-antimony-oxide-hydroxide, $n-Bu_2SbOOH$;
Tri-n-butyl-antimony-dihydroxide, $n-Bu_3Sb(OH)_2$; and
Triphenyl-antimony-dichloride, $Ph_3SbCl_2$.

Halogen derivatives of the organo-antimony compounds, such as $Ph_3SbCl_2$, are particularly useful as catalyst components for the preparation of epoxy polymers having a high content of ether-soluble portions, according to the present invention, and in part produce the polymers in higher yield.

The organo-antimony compounds useful according to the invention are known in the art and can be prepared according to known methods, for example as follows:

$PhSbO(OH)_2$: By the reaction of phenyl diazonium chloride with antimony (III) chloride and subsequent alkaline hydrolysis [H. Schmidt, Ann. 421, 188 (1920)].
$Bu_2SbOOH$, $Bu_3Sb(OH)_2$: By the aqueous hydrolysis of the corresponding alkoxy compounds which are obtained from the corresponding halogen compounds [H. A. Meinema and J. G. Noltes, Organoantimony Coordination Chemistry, 1971 (Utrecht)].
$Me_2SbOOH$: By the alkaline hydrolysis of dimethyl antimony oxide bromide [G. T Morgan et al., Proc. Roy. Soc. (London) 110 A, 523 (1926)].
$Ph_2SbOOH$: By the alkaline hydrolysis of diphenyl-antimony-trichloride [A. Michaelis et al., Ann. 233 59 (1886); G. T. Morgan et al., J. Chem. Soc., 99 2295 (1911); H. Schmidt, Ann. 421, 235 (1920)].
$Ph_3Sb(OH)_2$: By the alkaline hydrolysis of triphenyl antimony dichloride [A. Michaelis et al., Ann. 233, 51 (1886).
$Ph_4SbOH$: By the alkaline hydrolysis of tetraphenylantimony bromide [H. E. Affsprung et al., Anal. Chem., 32, 1164 (1960); A. L. Beauchamps et al., J. Am. Chem. Soc., 91, 297 (1969)].
$Ph_5Sb$: By the reaction of tetraphenyl antimony chloride or triphenyl antimony dichloride with phenyl lithium (G. Wittig et al., Ann. 577, 26 (1952)].

The organic radicals R' on the aluminum atom in the compound $R'_3Al$ may also vary. Aluminum compounds having branched alkyl radicals are preferred. The following compounds can be named as exemplary of this class of materials:

Tri-iso-butyl-aluminum, i-$Bu_3Al$;
Tri-n-butyl-aluminum, n-$Bu_3Al$;
Tri-iso-hexyl-aluminum, i-$Hex_3Al$;
Tri-n-hexyl-aluminum, n-$Hex_3Al$;
Di-iso-butyl-aluminum-hydride, i-$Bu_2AlH$.

It is noteworthy that particular radicals, as well as the mol ratio of Al:Sb in the catalyst, have an influence on the crystallinity of the epoxy polymer materials produced. As is made clear by Example 6 in Table V, an almost pure amorphous material which is of particular value is obtained by several different mixed catalyst compositions. In contrast, an almost completely crystalline polymer is obtained when, for example, tri-iso-alkyl-aluminum is combined with various of the named antimony compounds as catalyst components. Tests have shown that intermediate states of crystallinity in the polymers can be obtained by specific mixtures of the mixed catalysts.

As noted earlier, effective mixed catalysts can be prepared in an aluminum:antimony mol ratio between 1:1 and 10:1. Particular and specific properties in the catalyst are observed when the mol ratio is between 1:1 and 4:1. Also, the mixed catalyst according to the invention is effective for polymerization over a large concentration range (from 0.1 to about 3 mol percent of the monomer), in which range a total catalyst concentration of at most 0.5 mol percent is of particular advantage.

During the hydrolysis of organoantimony halides or organoantimony esters for the preparation of the antimony component of the mixed catalyst, it is possible that a portion of the Sb—C bonds may hydrolyze so that a catalyst may contain some $Ph_2SbOOH$ and $PhSbO(OH)_2$ in addition to $Ph_3Sb(OH_2)$, for example.

Elevated temperatures and times as long as several hours may be employed for aging the catalysts. However, it is to be stressed that room temperature (20° C.) is sufficient to prepare an outstanding mixed catalyst with an aging period of only 15 minutes. Indeed, it is possible to employ the catalysts immediately after combining the components, without any aging.

The catalysts according to the present invention effect the polymerization of epoxy compounds of the formula

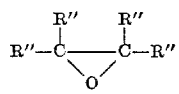

wherein the radicals R″, which may be all different, all the same, or some the same and some different, are hydrogen, alkyl or cycloalkyl having up to 8 carbon atoms, aryl having from 6 to 10 carbon atoms, or may be alkaryl or aralkyl. In particular, at least one of the radicals R″ is preferably halogen-substituted in the α-position with respect to the C-atom to which it is joined. Such preferred halo-substituted epoxy compounds include, for example, epichlorohydrin, epibromohydrin, methallyl chloride epoxide, trifluoromethyl ethylene oxide, perfluoropropylene oxide, dichloroisobutylene epoxide, 1,2-dichloro-3,4-epoxybutane, 1,1-dichloro-2,3-epoxypropane, and 1,1,1-trichloro-2,3-epoxypropane. The epoxy compound to be polymerized should have at most a total of 30 carbon atoms in the molecule.

Using the catalysts according to the invention, high polymers with advantageous properties are obtained to particular advantage from epichlorohydrin (in this compound three of the radicals R″=H, and one=—$CH_2Cl$).

The polymerization of epoxy compounds with the catalyst according to the present invention takes place in a strongly exothermic reaction. Thus, the reaction is conveniently carried out at room temperature, optionally with cooling. In general, the reaction temperature should be between −20° C. and +65° C.

The polymerization is suitably (but not necessarily) carried out in an inert solvent or inert solvent mixture in order to moderate the reaction. The weight ratio of solvent:reagents can be varied over a broad range. Nevertheless, it is advantageous to maintain the ratio of solvent:reagents between about 1:1 and 10:1. As solvents, aromatic hydrocarbons such as toluene and benzene, and aliphatic hydrocarbons such as hexane or kerosene, are particularly useful. The polymerization process can be carried out either in a discontinuous or continuous fashion.

The rubbery polymers (molecular weight greater than $1 \times 10^6$) prepared according to the process of the present invention are easily vulcanized according to known methods using cross-linking agents. Antioxidizers, fillers coloring agents, accelerators, and the like, can be added according to choice. The vulcanized products are characterized by a good appearance and high elasticity, and are resistant to ozone.

A better understanding of the present invention and of its many advantages will be had by referring to the following specific examples given by way of illustration.

EXAMPLE 1

0.2 part by weight of $(C_6H_5)_2SbOOH$ and a solution of 0.5 part by weight of triisobutylaluminum (corresponding with a catalyst concentration of 0.5 mol percent) in 12.5 parts by weight of toluene were introduced into a dry polymerization vessel under a nitrogen atmosphere. The mixture was stirred for several minutes at 20° C. Then, 59 parts by weight of epichlorohydrin in 450 parts by weight of toluene were added with further stirring. The temperature rose by a few degrees centigrade. The batch was left to stand for ten hours at 20° C. Then, ether containing 10 parts by weight of methanol for inactivating the catalyst, was added. The solvent was decanted and the ether-insoluble polymer was treated with ether and ethanol containing some hydrochloric acid. Subsequently, the polymer was washed with methanol and finally with a methanolic solution of an anti-oxidant, such as 4,4′-thiobis-(6-t-butyl-m-cresol). After drying for 15 hours in vacuum at 50° C., a white rubbery mass was obtained in a yield of 91 percent. The molecular weight of this polymer, calculated from the relative viscosity measured in a 0.1 percent solution in cyclohexanone at 50° C., was $3.5 \times 10^6$. The polymer was almost completely amorphous, as was determined by a solubility test in acetone over a period of 16 hours.

EXAMPLE 2

In order to investigate the effect of reaction time and reaction temperature on yield and molecular weight, the following series of comparative tests was performed. For the series, the method of Example 1 was employed and in each case 0.108 part by weight of $(C_6H_5)_2SbOOH$ and 0.28 part by weight of triisobutyl-aluminum were employed. The reaction was carried out in 64 parts by weight of benzene with 32 parts by weight of epichlorohydrin at 20° C. and at 60°–65° C. After different periods of time, the reaction was interrupted by the addition of small amounts of methanol and the product was worked up as in Example 1. The results are presented in Table I(a) below.

TABLE I(a)

| Test | Reaction time | Reaction temperature, 20° C. | | Reaction temperature, 60°–65° C. | |
|---|---|---|---|---|---|
| | | Yield (percent) | MW ($\times 10^6$) | Yield (percent) | MW ($\times 10^6$) |
| 1 | 15 minutes | 49 | 1.9 | 78 | 2.5 |
| 2 | 30 minutes | 51 | 2.0 | 80 | |
| 3 | 1 hour | 59 | 2.3 | 57 | |
| 4 | 2 hours | 65 | 2.5 | 55 | |
| 5 | 4 hours | 78.5 | 2.7 | 57 | |
| 6 | 6 hours | 87 | | 56 | 1.08 |
| 7 | 20 hours | 100 | 3.3 | | |

Table I(b) shows the yields at a reaction temperature of 0° C. compared with the yield at 20° C. Mol ratio Sb:Al=1:4; total catalyst concentration=1 mol percent; reaction time=20 hours. Otherwise, the tests were made as in Example 1. One polymerization was also carried out at −20° C.

TABLE I(b)

| Test No. | Sb-component | Al-component | Yield (percent at— 20° C. | 0° C. | −20° C. |
|---|---|---|---|---|---|
| 1 | Ph₂SbOOH | i-Bu₃Al | 91 | 100 | 77 |
| 2 | Ph₂SbOOH | i-Hex₃Al | 100 | 100 | |
| 3 | PhSbO(OH)₂ | n-Bu₃Al | 59 | 53 | |
| 4 | PhSbO(OH)₂ | i-Bu₃Al | 79 | 91 | |
| 5 | PhSbO(OH)₂ | n-Hex₃Al | 74 | 74 | |
| 6 | PhSbO(OH)₂ | i-Hex₃Al | 66 | 64 | |
| 7 | Me₂SbOOH | n-Bu₃Al | 51 | 58 | |
| 8 | Me₂SbOOH | i-Bu₃Al | 65 | 77 | |
| 9 | Me₂SbOOH | n-Hex₃Al | 39 | 57 | |
| 10 | Me₂SbOOH | i-Hex₃Al | 100 | 100 | |
| 11 | Bu₃Sb(OH)₂ | i-Bu₃Al | 75 | 100 | |
| 12 | Bu₃Sb(OH)₂ | i-Hex₃Al | 85 | 100 | |

EXAMPLE 3

A further test series was carried out according to Example 2 using the following parameters:

Aging time in the preparation of the catalysts=15 minutes;
Aging temperature in the preparation of the catalysts=20° C.;
Weight ratio of solvent (benzene):epichlorohydrin=4:1;
Ratio Sb:Al=1:4; Total catalyst concentration=1 mol percent.

Table II shows the dependence of the yield (given in weight percent) on the polymerization time.

TABLE II

| Polymerization time | Yield PhSbO(OH)₂, i-Hex₃Al | Ph₂SbOOH, i-Bu₃Al | Ph₃Sb(OH)₂,* i-Bu₃Al | Me₂SbOOH, i-Hex₃Al | n-Bu₃Sb(OH)₂, i-Hex₃Al |
|---|---|---|---|---|---|
| 15 minutes | 8 | 83 | 8 | 78 | 89 |
| 30 minutes | | 98 | 21 | 89 | 95 |
| 1 hour | | 100 | 32 | 95 | 91 |
| 2 hours | 30 | 98 | 51 | 89 | 100 |
| 20 hours | 75 | | 100 | | |

*Molar ratio Sb/Al=1:1.

EXAMPLE 4

To examine the influence of the aging temperature and aging time used in the preparation of the catalyst on its effectiveness, Example 1 was repeated with variation of the aging temperature and aging period. All other conditions set forth in Example 1 were the same. The results are evident from Table III.

TABLE III

| Test | Aging Temperature (° C.) | Time (mins.) | Yield (weight percent) | MW (×10⁶) |
|---|---|---|---|---|
| 1a | 20 | 15 | 100 | 3.3 |
| 1b | 80 | 15 | 83 | 2.3 |
| 2a | 20 | 30 | 100 | 2.9 |
| 2b | 80 | 30 | 100 | 3.5 |
| 3a | 20 | 60 | 93 | |
| 3b | 80 | 60 | 93 | 3.7 |
| 4a | 20 | 120 | 95 | 2.6 |

EXAMPLE 5

A further test series was carried out according to Example 4 with variation of the aging conditions in preparing the mixed catalysts. The catalyst components were PhSbO(OH)₂ and i-Hex₃Al in a concentration of 0.2 mol percent and 0.8 mol percent. n-Hexane was employed as a solvent in a weight ratio of solvent:epichlorohydrin=2:1. The results are given in Table IV.

TABLE IV

| Test | Aging Temperature (° C.) | Time (mins.) | Weight percent Yield | Amorphous fraction |
|---|---|---|---|---|
| 1b | 50 | 15 | 85 | 9 |
| 1c | 80 | 15 | 99 | 10 |
| 2a | 20 | 30 | 72 | 18 |
| 2b | 50 | 30 | 88 | 8-12 |
| 2c | 80 | 30 | 90 | 8 |
| 3b | 50 | 60 | 98 | 24-25 |
| 3c | 80 | 60 | 96 | 11 |
| 4b | 50 | 120 | 100 | 8 |
| 4c | 80 | 120 | 99 | 11 |

EXAMPLE 6

In order to demonstrate that uniformly good results can be obtained with mixed catalysts of this type having different compositions, and that the crystalline portion of polyepichlorohydrin can be determined in advance by a suitable composition of the mixed catalyst, tests were carried out according to Example 1 wherein the catalyst components were varied as shown below in Table V.

TABLE

[Yield/Amorphous Fraction (both in weight percent) of polyepichlorohydrin as a function of the composition of the mixed catalyst]

| | Al:Sb=4:1 (mol ratio) | | | | | | Bu₃Sb(OH)₂/PhSbO(OH)₂ (3:1) | Al:Sb=1:1 (mol ratio), Ph₃Sb(OH)₂ |
|---|---|---|---|---|---|---|---|---|
| R₃Al | PhSbO(OH)₂ | Ph₂SbOOH | Ph₄SbOH | Me₂SbOOH | Bu₂SbOOH | Bu₃Sb(OH)₂ | | |
| 3 R=i-butyl- | 76/20 | 100/100 | | 93/70 | 100/98 | 87/82 | 72/56 | 100/98 |
| 2 R=n-butyl- | 60/14 | 44/— | | 53/15 | 66/15 | | | 42/22 |
| 3 R=i-hexyl- | 72/18 | 100/84 | 38/88 | ¹ 85/57 | ¹ 100/85 | 100/94 | | 100/34 |
| 3 R=n-hexyl- | 66/16 | 38/19 | | 45/15 | 66/29 | | | 42/16 |
| 2 R=n-octyl- | 62/16 | 40/10 | | | | | | 49/26 |
| 2 R=n-butyl-/i-butyl-(1:1) | | 100/46 | | | | | | |

¹ The total catalyst concentration should not be greater than 0.5 mol percent since otherwise the reaction is too violent.

What is claimed is:
1. A catalyst useful for the polymerization of epoxy compounds consisting essentially of a mixture of:
(1) an organoantimony compound of the formula

$$R_mSbX_n$$

wherein R is aryl or alkyl directly linked to the antimony atom, X is at least one member selected from the group consisting of monovalent hydroxy, monovalent halogen, and divalent oxide oxygen, m is an integer from 1 to 5 when R is aryl and an integer from 1 to 3 when R is alkyl, and n has an integral value between 0 and 4, depending on m and the nature and valency of X, such that the pentavalency of the antimony atom is satisfied; and
(2) an organoaluminum compound of the formula $$R'_3Al$$

wherein R' is alkyl having up to 8 carbon atoms, the mol ratio of organoantimony compound to organoaluminum compound in said catalyst being between 1:1 and 1:10.

2. A catalyst as in claim 1 wherein R in said organoantimony compound is phenyl or alkyl having 1 to 4 carbon atoms.

3. A catalyst as in claim 1 wherein $m$ is an integer from 1 to 3.

4. A catalyst as in claim 1 wherein R' is alkyl having 4 to 6 carbon atoms.

5. A catalyst as in claim 1 wherein the mol ratio of organoantimony compound to organoaluminum compound is between 1:1 and 1:4.

6. The method of polymerizing an epoxy compound of the formula

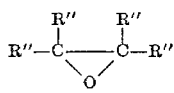

wherein the substituents R" are the same or different and are hydrogen, alkyl or cycloalkyl having up to 8 carbon atoms, aryl having 6 to 10 carbon atoms, alkaryl or aralkyl, at least one of said substituents R" being halogen substituted in the α-position with respect to the C-atom to which it is joined, which method comprises polymerizing said epoxy compound in the presence of a catalyst as in claim 1.

7. The method as in claim 6 wherein said epoxy compound is epichlorohydrin.

8. The method as in claim 6 wherein the polymerization is carried out in an inert solvent.

9. The method as in claim 6 wherein the catalyst concentration is between 0.1 and 3 mol percent of the epoxy compound.

10. The method as in claim 6 wherein the catalyst concentration is between 0.1 and 0.5 mol percent of the epoxy compound.

References Cited
UNITED STATES PATENTS

| | | | |
|---|---|---|---|
| 3,030,316 | 4/1962 | Bailey | 260—2 |
| 3,296,152 | 1/1967 | Achon | 260—2 |
| 3,471,411 | 10/1969 | Bowman et al. | 252—431 |

WILLIAM H. SHORT, Primary Examiner

E. A. NIELSEN, Assistant Examiner

U.S. Cl. X.R.

252—431 R; 260—615 P, 615 BF

UNITED STATES PATENT OFFICE
CERTIFICATE OF CORRECTION

Patent No. 3,767,599          Dated October 23, 1973

Inventor(s) Henricus Gerardus Joseph Overmars et al.

It is certified that error appears in the above-identified patent and that said Letters Patent are hereby corrected as shown below:

In the heading, after "Schering AG.," insert

--Berlin and--.

Signed and sealed this 23rd day of July 1974.

(SEAL)
Attest:

McCOY M. GIBSON, JR.
Attesting Officer

C. MARSHALL DANN
Commissioner of Patents